United States Patent
Chang et al.

(10) Patent No.: US 7,259,794 B2
(45) Date of Patent: Aug. 21, 2007

(54) DE-INTERLACING DEVICE AND METHOD THEREFOR

(75) Inventors: Fung-Jane Chang, Hsinhua (TW); Ling-Shiou Huang, Hsinhua (TW); Shen-Chuan Tai, Hsinhua (TW)

(73) Assignee: Himax Technologies Limited, Tainan County (TW)

( * ) Notice: Subject to any disclaimer, the term of this patent is extended or adjusted under 35 U.S.C. 154(b) by 517 days.

(21) Appl. No.: 10/942,002

(22) Filed: Sep. 16, 2004

(65) Prior Publication Data
US 2005/0068334 A1    Mar. 31, 2005

Related U.S. Application Data

(60) Provisional application No. 60/505,622, filed on Sep. 25, 2003.

(30) Foreign Application Priority Data
Dec. 31, 2003    (TW) ............... 92137852 A (51) Int. Cl.
*H04N 11/00*    (2006.01)
*H04N 7/01*    (2006.01)

(52) U.S. Cl. ...................... 348/452; 348/448

(58) Field of Classification Search ............... 348/448, 348/449, 451, 452, 458
See application file for complete search history.

(56) References Cited

U.S. PATENT DOCUMENTS

| | | | |
|---|---|---|---|
| 5,886,745 A * | 3/1999 | Muraji et al. | 348/448 |
| 6,181,382 B1 * | 1/2001 | Kieu et al. | 348/459 |
| 6,421,090 B1 * | 7/2002 | Jiang et al. | 348/452 |
| 6,985,187 B2 * | 1/2006 | Han et al. | 348/452 |

\* cited by examiner

*Primary Examiner*—Michael H. Lee
(74) *Attorney, Agent, or Firm*—Rabin & Berdo, PC (57) ABSTRACT

A de-interlacing device and method therefor for de-interlacing an image. The image includes at least one field, which includes a plurality of pixels arranged in an M*N matrix. The de-interlacing device is for determining the brightness value of a current pixel and includes the following elements. A motion detector is for determining whether or not the current pixel is motional. An edge detector detects an edge type of the current pixel if the current pixel is motional. An edge-based de-interlacer includes a reference pixel determiner for determining a plurality of edge reference pixels having the strongest correlation with the current pixel according to the edge type, and a brightness value determiner for deriving the brightness value of the current pixel according to the edge reference pixels.

21 Claims, 9 Drawing Sheets

| ANGLE SLOPE | APPROXIMATELY HORIZONTAL | APPROXIMATE 45° | APPROXIMATELY VERTICAL |
|---|---|---|---|
| POSITIVE SLOPE | / | / | / |
| NEGATIVE SLOPE | \ | \ | \ |

DE-INTERLACING DEVICE AND METHOD THEREFOR

This application claims the benefit of provisional application Ser. No. 60/505,622, filed Sep. 25, 2003, and the benefit of Taiwan application Serial No. 92137852, filed Dec. 31, 2003, the subject matters of which are incorporated herein by reference.

BACKGROUND OF THE INVENTION

1. Field of the Invention

The invention relates in general to a de-interlacing device and a method therefor, and more particularly to an edge-based de-interlacing device adapted to motion frames, and a method therefor.

2. Description of the Related Art

A film is generally shot and displayed in an interlaced manner. Taking the television as an example, the displaying of one frame is completed by firstly displaying an odd field thereof and then an even field thereof. The odd field is composed of the odd-numbered lines of the frame, and the even field is composed of the even-numbered lines of the frame.

The typical television has a refresh rate of 30 Hz. That is, 30 frames are displayed in one second. Because the odd and even fields of the frame are alternately displayed, 60 fields are displayed in one second.

The demand on the image quality is getting higher and higher, and the quality of a non-interlaced (i.e., progressive) image is better than that of the interlaced image. Thus, advanced video displaying devices, for example, the high definition television (HDTV), adopt the progressive displaying function.

Figure 1A:
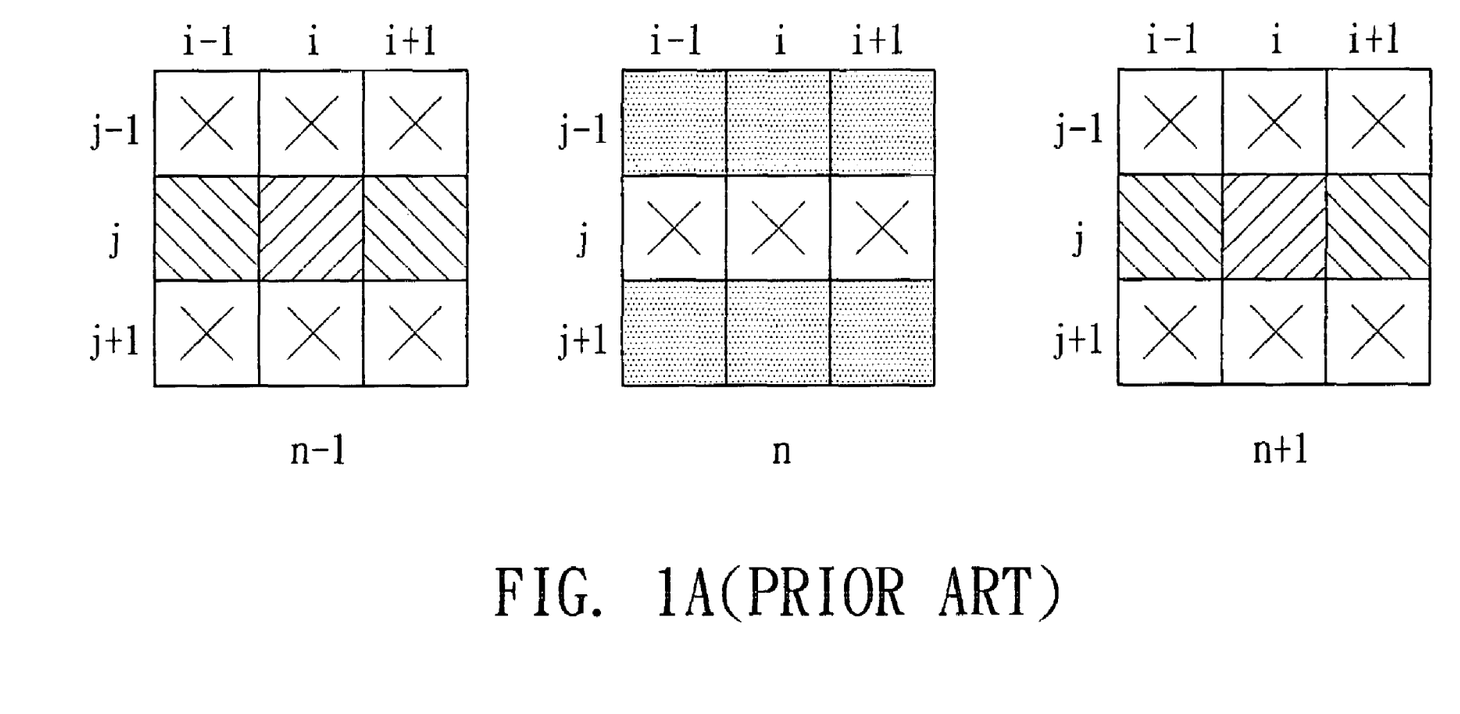
FIG. 1A is a schematic diagram showing an interlaced image including (n−1)th, n-th and (n+1)-th fields.
Figure 1B:
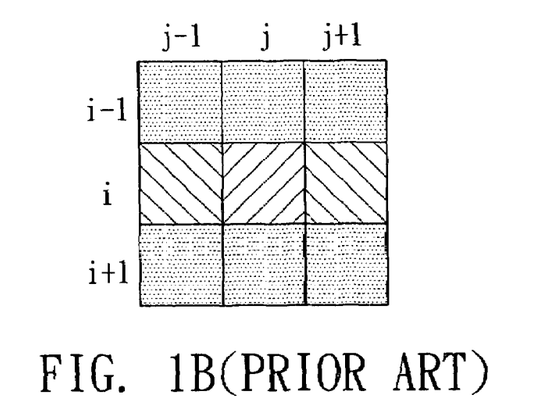
FIG. 1B shows a non-interlaced image obtained according to FIG. 1A.

If the interlaced images are to be displayed in the non-interlaced manner, the interlaced frame has to be de-interlaced and then displayed once in a complete frame. FIG. 1A illustrates an interlaced image including (n−1)th, n-th and (n+1)th fields. In FIG. 1A, pixels having the x coordinates of (i−1) to (i+1) and y coordinates of (j−1) to (j+1) are described as an example. Since each field of the interlaced image only includes odd-numbered or even-numbered horizontal lines to be displayed, only the pixels on the odd-numbered or even-numbered horizontal lines in each field have valid values. In FIG. 1A, the symbol "X" indicates that the pixel in this field has no valid brightness value. De-interlacing the interlaced image is to fill proper brightness values in the pixels having no valid brightness value in each field. Taking the temporal average method as an example, the brightness value of the pixel (i,j) in the n-th non-interlaced frame may be the average of the brightness values of the pixel (i,j) of the interlaced image in the (n−1)th and (n+1)th fields. According to the above-mentioned method, the obtained n-th frame of the non-interlaced image is shown in FIG. 1B.

However, the de-interlacing method mentioned above tends to cause the problem of image flicker. Because the two fields of the interlaced image are shot at different time instants, the image has to be further processed so as to enhance the image quality.

SUMMARY OF THE INVENTION

It is therefore an object of the invention to provide a de-interlacing device and a method therefor.

The invention achieves the above-identified object by providing a de-interlacing device being used for an image. The image includes at least one field, which includes a plurality of pixels arranged in an M*N matrix. The de-interlacing device is for determining a brightness value of the current pixel and includes a motion detector for determining whether or not the current pixel is motional, an edge detector for detecting an edge type of the current pixel if the current pixel is motional, and an edge-based de-interlacer, which comprises a reference pixel determiner for determining a plurality of edge reference pixels having the strongest correlation with the current pixel according to the edge type, and a brightness value determiner for determining the brightness value of the current pixel according to the edge reference pixels.

The invention also achieves the above-identified object by providing a de-interlacing method. First, it is determined whether or not the current pixel is motional. If the current pixel is motional, the edge type of the current pixel is detected. The current pixel can be classified as one of the edge types, that is, a smooth region, a vertical edge, a horizontal edge, and an inclined edge. Next, a plurality of edge reference pixels having the strongest correlation with the current pixel is determined according to the edge type. Finally, the brightness value of the current pixel is determined according to these edge reference pixels.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 2:
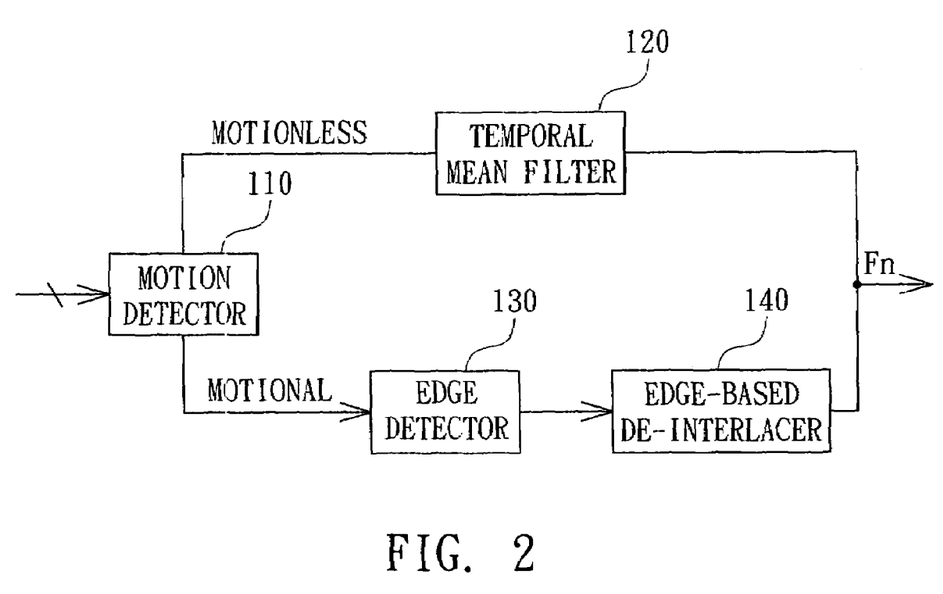
FIG. 2 is a block diagram showing a de-interlacing device according to a preferred embodiment of the invention.

FIG. 2 is a block diagram showing a de-interlacing device according to a preferred embodiment of the invention. The de-interlacing device 100 includes a motion detector 110, a temporal mean filter 120, an edge detector 130, and an edge-based de-interlacer 140.

The motion detector 110 receives interlaced image data, and determines whether or not the interlaced image data is motional or motionless. If the interlaced image data is motionless, the interlaced image data is de-interlaced by the temporal mean filter 120; or otherwise processed by the edge detector 130. The motion detector 110 of this embodiment is to determine that each pixel belongs to the motion portion or motionless portion of the image. If the pixel belongs to the motion portion, it is passed to the edge detector 130; or otherwise to the temporal mean filter 120.

The temporal mean filter 120 de-interlaces the motionless pixel and then outputs the de-interlaced pixel. The manner for de-interlacing the motionless image is, for example, a conventional temporal average method and detailed description thereof will be omitted.

The edge detector 130 detects whether or not the motion image pixel is at the edge of the image, and outputs a detection result to the edge-based de-interlacer 140. The edge-based de-interlacer 140 utilizes a corresponding de-interlacing method to obtain a better image with a higher speed according to the detection result of the edge detector 130.

The function and operation of each element of the de-interlacing device 100 have been briefly described in the above, and will be described in detail in the following.

Motion Detector 110

Figure 3:
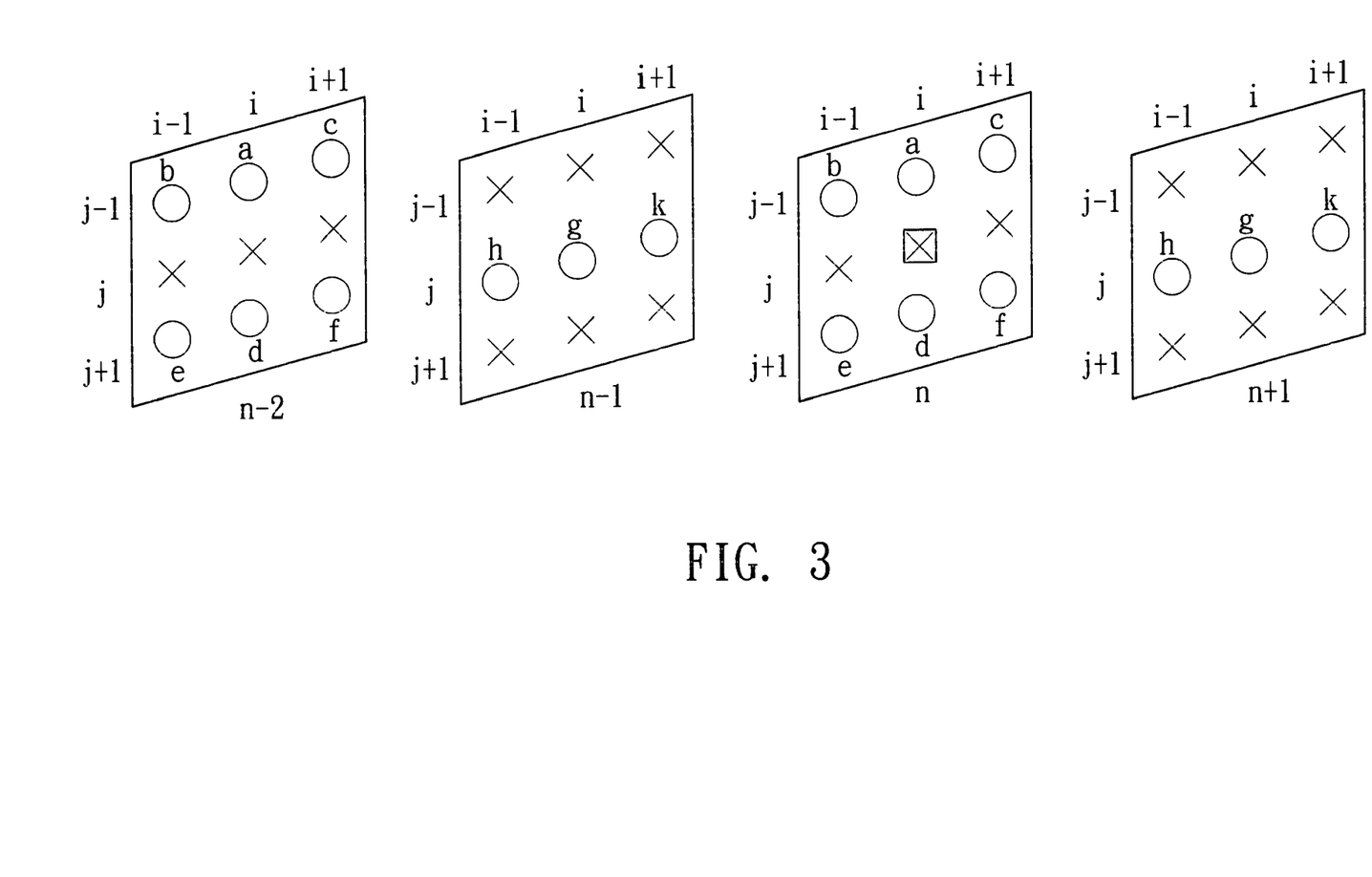
FIG. 3 is a schematic diagram showing four fields required by the BPPD method.

The conventional motion image detection is performed according to the BPPD (Brightness Profile Pattern Difference) method. The BPPD method utilizes the first-order difference and the second-order difference of the brightness value to determine the motion image. The BPPD method enhances the moving sensitivity in the left and right directions, but ignores the movements in the up and down directions. The conventional BPPD method will be described in the following. The parameters required by the BPPD method includes a brightness value B, a brightness difference Bd, a brightness profile value D and a brightness profile value P. FIG. 3 is a schematic illustration showing four fields required by the BPPD method. The four fields are the (n−2)th, (n−1)th, n-th and (n+1)th fields of the pixels a, b, c, d, e, f, g, h and k. Each field only includes an odd-numbered or even-numbered horizontal line that is displayed, so only the pixels represented by "O" in FIG. 3 have the valid values in each field, while the pixels represented by "X" have no valid brightness values in this field. Herein, determining whether or not the pixel (i,j) in the n-th field is motional will be described as an example. First, the brightness value B is defined. For example, the brightness value of the pixel g in the (n+1)th field of is $B_g^{n+1} = f(\vec{x}, n+1)$, and the brightness value of the pixel k in the (n+1)th field is $B_k^{n+1} = f(\vec{x} + \vec{x}_u, n+1)$, wherein $\vec{x} = [i\ j]^t$, $\vec{x}_u = [\lambda\ 1]^t$, t represents the transposing, and $\lambda$ is the distances from the pixels g to h or from the pixels g to k. The brightness values of other pixels may be determined in this way. The brightness difference Bd is then defined as:

$$Bd_a^n = |B_a^n - B_a^{n-2}| \quad (2\text{-}1)$$

Next, the brightness profile values D are defined as:

$$D_{ab}^n = B_a^n - B_b^n \quad (2\text{-}2), \text{ and}$$

$$D_{ac}^n = B_a^n - B_c^n \quad (2\text{-}3)$$

According to the previous discussions, if the value of $\lambda$ is 2, the sensitivity with respect to the noise can be reduced. Next, the brightness profile value P is defined as:

$$P_a^n = |D_{ab}^n - D_{ab}^{n-2}| + |D_{ac}^n - D_{ac}^{n-2}| \quad (2\text{-}4)$$

The brightness profile value P is for measuring the difference gradients between one pixel and its adjacent pixels in different fields.

In the conventional BPPD method, the following six parameter values are used to determine whether the image is motional:

$$Bd_a^n = |B_a^n - B_a^{n-2}| \quad (2\text{-}5),$$

$$Bd_d^n = |B_d^n - B_d^{n-2}| \quad (2\text{-}6),$$

$$Bd_g^{n+1} = |B_g^{n+1} - B_g^{n-1}| \quad (2\text{-}7),$$

$$P_a^n = |D_{ab}^n - D_{ab}^{n-2}| + |D_{ac}^n - D_{ac}^{n-2}| \quad (2\text{-}8)$$

$$P_d^n = |D_{de}^n - D_{de}^{n-2}| + |D_{df}^n - D_{df}^{n-2}| \quad (2\text{-}9), \text{ and}$$

$$P_g^{n+1} = |D_{gh}^{n+1} - D_{gh}^{n-1}| + |D_{gk}^{n+1} - D_{gk}^{n-1}| \quad (2\text{-}10)$$

The former three parameter values (i.e., the brightness differences, $Bd_a^n$, $Bd_d^n$, and $Bd_g^{n+1}$) may be used to detect the motion image. The later three parameter values (i.e., the horizontal brightness profile values, $P_a^n$, $P_d^n$, and $P_g^{n+1}$) is for increasing the moving sensitivity in the left and right directions. However, such a method does not consider the movements in the up and down directions. Thus, the embodiment of the invention further adds a parameter of a vertical brightness profile value to improve the motion image detection:

$$Pv^n = |D_{ad}^n - D_{ad}^{n-2}| + |D_{be}^n - D_{be}^{n-2}| + |D_{cf}^n - D_{cf}^{n-2}| \quad (2\text{-}11)$$

In addition, three threshold values Ta, Tb and Tc are defined for inspecting the parameters Bd, P and Pv, respectively. The motion detector 110 of the invention utilizes four fields to derive seven parameters as shown in Equations (2-5) to (2-11). When any one of the seven parameter values is greater than the corresponding threshold value, the current pixel $\vec{x}$ is classified as motional. According to the experimental result, better results are obtained by setting the threshold values Ta, Tb, and Tc to be between 10 and 15, between 20 and 40, and between 30 and 60, respectively.

The motion detector 110 includes a parameter generator (not shown) and a parameter comparator (not shown). The parameter generator is for determining three motion reference pixels located above a current pixel g, denoted by a, b, c, and three motion reference pixels under the current pixel g, denoted by d, e, f, and calculating the brightness differences, $Bd_a^n$, $Bd_d^n$, and $Bd_g^{n+1}$, the horizontal brightness profile values $P_a^n$, $P_d^n$, and $P_g^{n+1}$, and the vertical brightness profile values $Pv^n$ according to the motion reference pixels and the current pixel. The parameter comparator is for comparing the brightness differences, $Bd_a^n$, $Bd_d^n$ and $Bd_g^{n+1}$ to a first threshold value Ta. If any one of the brightness differences $Bd_a^n$, $Bd_d^n$, and $Bd_g^{n+1}$ is larger than the first threshold value Ta, the current pixel is motional. The parameter comparator is also for comparing the horizontal brightness profile values $P_a{}''$, $P_d{}''$, and $P_g{}''^{+1}$ to a second threshold value Tb. If any one of the horizontal brightness profile values $P_a{}''$, $P_d{}''$, and $P_g{}''^{+1}$ is larger than the second threshold value Tb, the current pixel is motional. Furthermore, the parameter comparator is for comparing the vertical brightness profile value $Pv''$ to a third threshold value Tc. If the vertical brightness profile value $Pv''$ is larger than the third threshold value Tc, the current pixel is motional.

Edge Detector 130

Figure 4A:
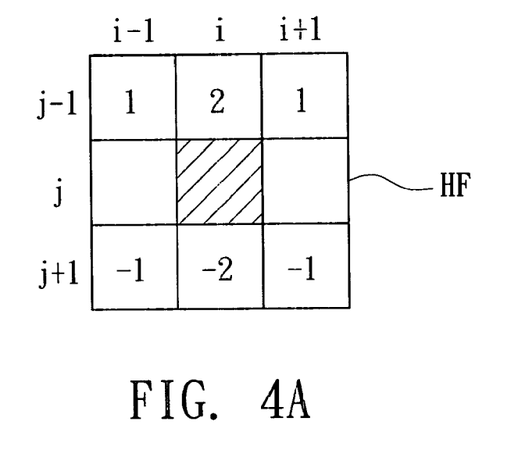
FIGS. 4A and 4B are schematic diagrams showing the 3×3 horizontal filter HF and vertical filter VF of the Sobel filter, respectively.
Figure 4B:
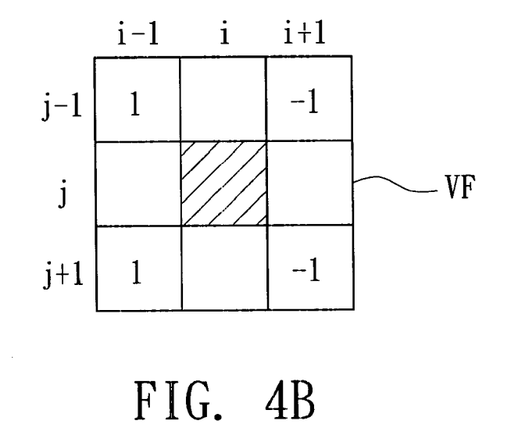

The edge detector 130 of the embodiment of the invention utilizes a modified Sobel filter to detect the edge direction. The gradients in the horizontal and vertical directions of the image are detected by using the Sobel filter. According to the obtained gradients, the pixels may be divided into four types of edges: a horizontal edge, a vertical edge, an inclined edge, and a smooth region. The horizontal edge indicates that the pixel is located on an edge in the horizontal direction. The vertical edge indicates that the pixel is located on an edge in the vertical direction. The inclined edge indicates that the pixel is located on an inclined edge. The smooth region indicates that the pixel is located in the smooth region with small image gradient variations. The angle between the inclined edge and the x-axis (horizontal axis) is 30, 45, 60 degrees or other. The Sobel filter includes a 3×3 horizontal filter and a 3×3 vertical filter. FIGS. 4A and 4B are illustrations of the 3×3 horizontal filter HF and vertical filter VF of the Sobel filter, respectively. The horizontal filter HF shown in FIG. 4A is for calculating the gradient of the image in the y-axis (vertical axis). The vertical filter VF shown in FIG. 4B is for calculating the gradient of the image in the x-axis. One row between the horizontal filter HF and the vertical filter VF is not used because this row is a horizontal line that does not appear in the field and no brightness value can be used. Operations are performed on the two filters, which serve as a sliding window, and the ambient pixels of each current pixel of the image, from left to right, so as to determine the horizontal coefficient H_coeff and vertical coefficient V_coeff of each pixel. As shown in FIG. 4A, the coordinates (i,j) denote the current pixel with unknown brightness, and H_coeff denotes the sum of the brightness values (ranging from 0 to 255, 256 gray-scale) of six pixels above and below the current pixel multiplied by the weighting coefficients of FIG. 4A. As shown in FIG. 4B, the coordinates (i,j) denote the current pixel with unknown brightness, and V_coeff denotes the sum of the brightness values (0~255, 256 gray-scale) of four pixels at the upper-left, lower-left, upper-right, and lower-right sides of the current pixel multiplied by the weighting coefficients of FIG. 4B. The horizontal coefficient H_coeff and the vertical coefficient V_coeff are respectively compared with the horizontal threshold value Th and the vertical threshold value Tv, and then the pixel belongs to which edge type may be obtained.

Figure 4C:
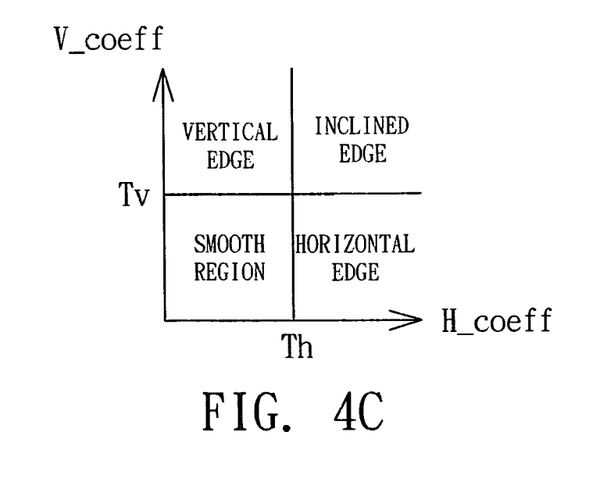
FIG. 4C shows the relationship between the vertical coefficient V_coeff and the horizontal coefficient H_coeff.

FIG. 4C shows the relationship between the vertical coefficient V_coeff and the horizontal coefficient H_coeff. When the horizontal coefficient H_coeff and the vertical coefficient V_coeff are respectively greater than the horizontal threshold value Th and the vertical threshold value Tv, the pixel belongs to the inclined edge. When the horizontal coefficient H_coeff and the vertical coefficient V_coeff are respectively smaller than the horizontal threshold value Th and the vertical threshold value Tv, the pixel belongs to the smooth region. When the horizontal coefficient H_coeff is greater than the horizontal threshold value Th and the vertical coefficient V_coeff is smaller than the vertical threshold value Tv, the pixel belongs to the horizontal edge. When the horizontal coefficient H_coeff is smaller than the horizontal threshold value Th and the vertical coefficient V_coeff is greater than the vertical threshold value Tv, the pixel belongs to the vertical edge. According to the experimental result, better effects may be obtained when the horizontal threshold value Th and the vertical threshold value Tv are respectively set to be in the region ranging from 40 to 80.

Edge-Based De-Interlacer 140

The edge-based de-interlacer 140 of this embodiment de-interlaces the image according to the calculating result of the edge detector 130. The edge-based de-interlacer 140 includes a reference pixel determiner (not shown) for determining a plurality of reference pixels having the strongest correlation with the current pixel according to the edge type, and a brightness value determiner (not shown) for deriving the brightness value of the current pixel according to the reference pixels. The de-interlacer 140 implements the corresponding de-interlacing method according to whether the current pixel is in the smooth region, the vertical edge, the horizontal edge or the inclined edge.

1. Smooth Region

When the current pixel is in the smooth region, the pixels above and below the current pixel are used as the reference pixels, and the brightness values thereof are averaged. Then, the brightness value Fo of the pixel in the non-interlaced frame are calculated according to the following equations:

$$F_o(\vec{x},n)=(1/2)\times\{f(\vec{x}-\vec{y_u},n)+f(\vec{x}+\vec{y_u},n)\} \qquad (4\text{-}1)$$

wherein $\vec{x}$ denotes the coordinates of the pixel, and $\vec{y_u}$ is a unit distance.

2. Vertical Edge

When the current pixel is on the vertical edge, it means that the pixel strongly correlates to its up and down pixels. Thus, the up and down pixels are used as the reference pixels, and the brightness values thereof are averaged to derive the brightness value of the pixel in the non-interlaced frame according to the following equation:

$$F_o(\vec{x},n)=(1/2)\times\{f(\vec{x}-\vec{y_u},n)+f(\vec{x}+\vec{y_u},n)\} \qquad (4\text{-}2)$$

3. Horizontal Edge

When the current pixel is on the horizontal edge, the current pixel strongly correlates to its left and right pixels. However, the horizontal line on which the current pixel is located has no valid brightness value, so the brightness value of the current pixel cannot be obtained using the brightness values in the same field. The conventional method is implemented by way of motion estimation. However, this method causes great loading in computation. This embodiment only uses the brightness value in the same field to obtain the brightness value of the current pixel, so the computation loading may be reduced with relatively good quality. Because the current pixel on the horizontal edge and its ambient pixel have very strong correlation, the brightness value of the current pixel is obtained by way of interpolation with proper pixels in this embodiment. This embodiment adopts the half-pel method to select the reference pixels and thus obtain the brightness value of the current pixel. First, the following brightness profile value is derived:

$$D_1 = |f(\vec{x} - \vec{y_1}, n) - f(\vec{x} + \vec{y_1}, n)|,$$

$$D_2 = |f(\vec{x} + \vec{y_2}, n) - f(\vec{x} - \vec{y_2}, n)|,$$

wherein $\vec{y}_1 = (2, \frac{1}{2})^t$, $\vec{y}_2 = (2, -\frac{1}{2})^t$, and $\vec{x} - \vec{y}_1$, $\vec{x} + \vec{y}_1$, $\vec{x} + \vec{y}_2$, $\vec{x} - \vec{y}_2$ are the selected reference pixels but not the actually existing pixels. The brightness value is calculated as follows:

taking four actual pixels corresponding to the current pixel positions (2,1), (2,−1), (−2,1) (−2,−1) as references, and defining the upper-left pixel a', lower-left pixel b', upper-right pixel c', and lower-right pixel d' corresponding to the current pixel;

taking the average of the brightness values of a' and b' as the brightness value of the virtual left pixel h' at the middle of the a' and b' positions, taking the average of the brightness values of c' and d' as the brightness value of the virtual right pixel k' at the middle of the c' and d' positions, wherein h' and k' are positioned at the left and right sides of the current pixel, respectively, and are not the actually existing pixels;

taking the average of the brightness values of a' and h' as the brightness value of the virtual upper-left pixel a" at the middle of the a' and h' positions, taking the average of the brightness values of b' and h' as the brightness value of the virtual lower-left pixel b" at the middle of the b' and h' positions, taking the average of the brightness values of c' and k' as the brightness value of the virtual upper-right pixel c" at the middle of the c' and k' positions, and taking the average of the brightness values of d' and k' as the brightness value of the virtual lower-right pixel d" at the middle of the d' and k' positions; and taking the absolute value of c" brightness value subtracted from b" brightness value as $D_1$, and taking the absolute value of a" brightness value subtracted from d" brightness value as $D_2$.

Next, the minimum of $D_1$ and $D_2$ is found:

$$D_{min} = \min(D_1, D_2).$$

Then, the brightness value of the current pixel may be obtained according to the following equations:

$$F_o(\vec{x}, n) = \frac{1}{2} \times [f(\vec{x} - \vec{y}_1, n) + f(\vec{x} + \vec{y}_1, n)], \text{ if } D_{min} = D_1$$

$$F_o(\vec{x}, n) = \frac{1}{2} \times [f(\vec{x} - \vec{y}_2, n) + f(\vec{x} + \vec{y}_2, n)], \text{ if } D_{min} = D_2$$

4. Inclined Edge

Figure 5A:
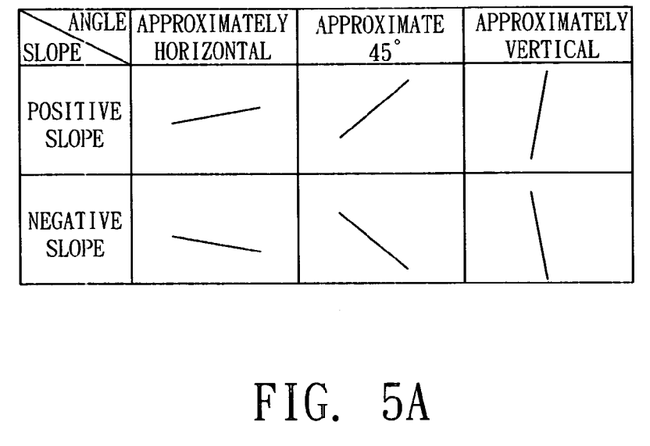
FIG. 5A is a schematic diagram showing the types of the inclined edges.

When the current pixel is positioned on the inclined edge, three steps are used to obtain the brightness value of the current pixel. The first and second steps are used to derive the direction information of the current pixel, i.e., the angle information and tilt information of the inclined edge. The first step is to derive the angle information of the inclined edge, i.e., the tilt angles. In this embodiment, the tilt angles of the inclined edge are divided into approximately horizontal, approximate 45 degrees, and approximately vertical. The second step is to derive the tilt information of the inclined edge (i.e., to determine whether its slope is positive or negative). FIG. 5A is a schematic illustration showing the types of the inclined edges, which are determined according to the first and second steps and includes six types of inclined edges. The third step is to derive the brightness value of the current pixel according to the direction information of the inclined edge determined in the first and second steps. The three steps will be described in the following.

4a. First Step: Calculate the Angle Information of the Inclined Edge.

In the first step, the angle information of the inclined edge is determined. First, the H_coeff and V_coeff obtained by the edge detector 130 are normalized into H_coeff' and V_coeff'. The inclined edge on which the current pixel is positioned is determined to be approximately vertical if:

$$V\_coeff' > H\_coeff' * \Omega,$$

wherein $\Omega$ is a constant ranging from 1.5 to 2 according to the experimental result. Inversely, the inclined edge on which the current pixel is positioned is determined to be approximately horizontal if:

$$H\_coeff' > V\_coeff' * \Omega;$$

otherwise, the inclined edge on which the current pixel is positioned is determined to be approximate 45 degrees.

4b. Second Step: Calculate the Tilt Information of the Inclined Edge.

Figure 5B:
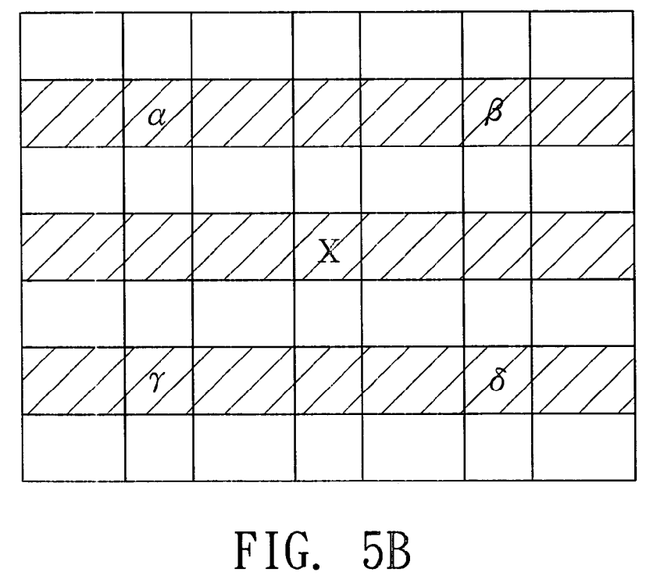
FIG. 5B is a schematic diagram showing the field for determining the slope of the inclined edge.

The second step is to derive the tilt information of the inclined edge, that is, to determine whether the slope of the inclined edge is positive or negative. FIG. 5B is schematic illustration showing the field for determining the slope of the inclined edge. The current pixel is x (coordinates $\vec{x}$) in the drawing, the hatched portions are the line with no valid brightness value, and other portions are the lines with the valid brightness values. When the second step is implemented, the slope direction of the inclined edge has to be determined according to the upper-left pixel α with no valid brightness value, the upper-right pixel β with no valid brightness value, the lower-left pixel γ with no valid brightness value, and the lower-right pixel δ with no valid brightness value. The embodiment derives the direction information of each pixel by way of horizontal scan (raster scan), the pixels α and β already have the direction information but the pixels γ and δ have no direction information, so the tilt direction thereof is approximately estimated in advance.

Figure 5C:
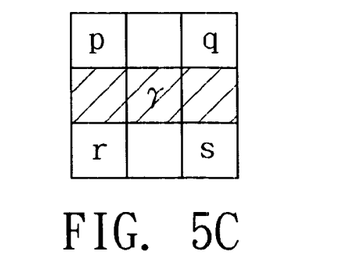
FIG. 5C shows a schematic diagram for estimating the tilt information of the pixel γ.

FIG. 5C shows a schematic illustration for estimating the tilt information of the pixel γ. Because the pixels p, q, r and s have the known brightness values and are respectively referred to as the upper-left pixel p with the known brightness value, the upper-right pixel q with the known brightness value, the lower-left pixel r with the known brightness value, the lower-right pixel s with the known brightness value, they can be used to estimate the pixel γ. If the brightness values of the pixels p and s have higher correlation but the brightness values of the pixels q and r do not have higher correlation, the pixel γ may be estimated as positioning on the inclined edge of the negative slope; or otherwise, γ may be estimated as positioning on the inclined edge of the positive slope. Similarly, the slope direction of the inclined edge of the pixel δ is also estimated according to such a method. The tilt direction of the current pixel may be derived using the following tilt direction determining procedure according to the direction information of the pixels α and β as well as the estimated tilt directions of γ and δ.

The tilt direction determining procedure includes two conditions. In the first condition, it is determined whether or not the tilt manners of the pixel α and pixel δ are the same.

If so, the tilt direction of the current pixel is the same as that of the pixel α. If not, it is determined whether or not the second condition is satisfied. In the second condition, it is determined whether or not the tilt directions of the pixel β and pixel γ are the same. If so, the tilt direction of the current pixel is the same as that of the pixel β. If not, the tilt direction of the current pixel is set to be indefinite.

4c. Third Step: Calculate the Current Brightness Value According to the Direction Information of the Inclined Edge.

Figure 6A:
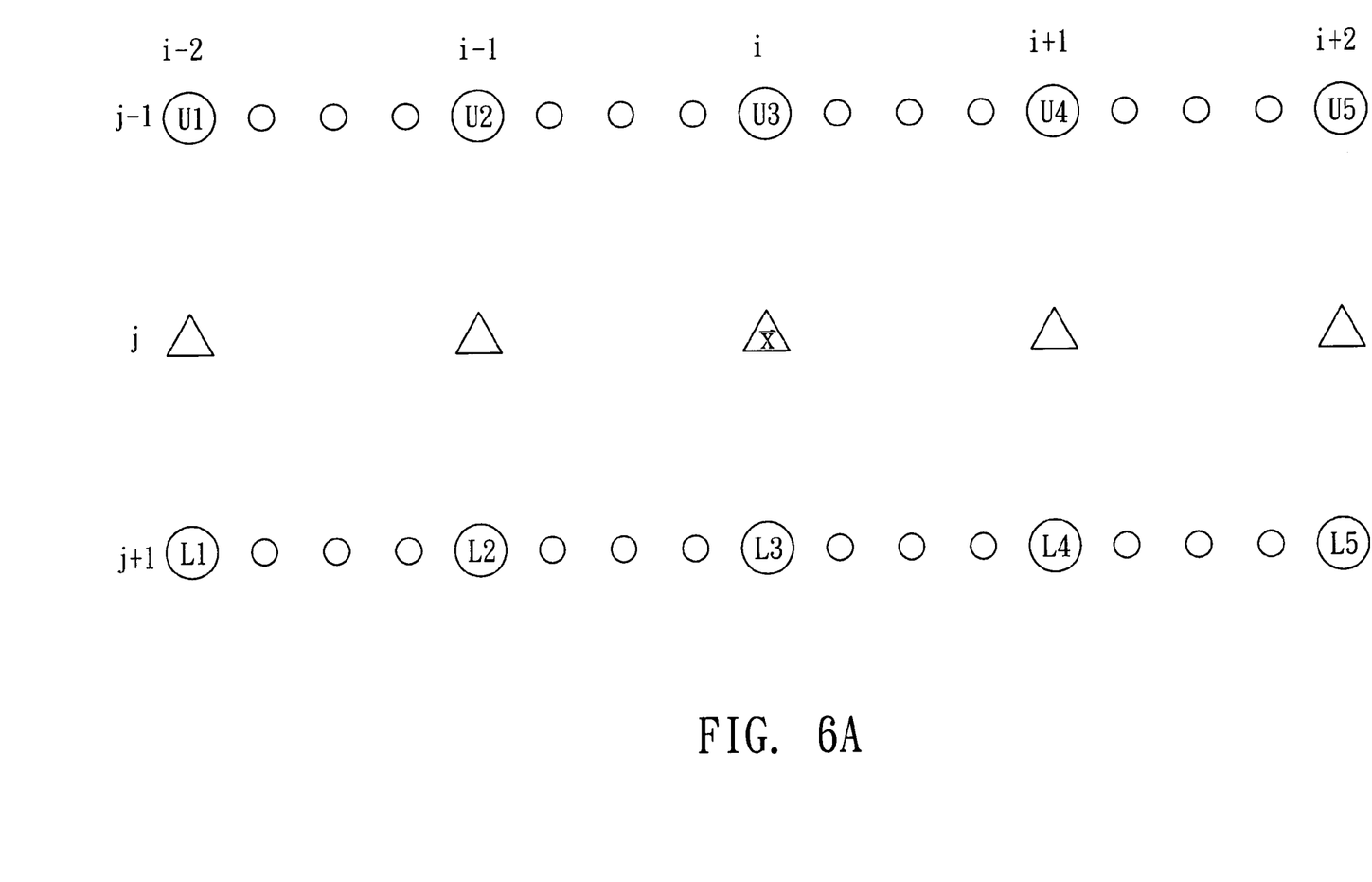
FIG. 6A is a schematic diagram showing edge reference pixels that are used when the de-interlacer 140 performs the third step.

Next, the third step is performed to derive the brightness value of the current pixel according to the direction information of the current pixel, wherein a quarter-pel method is used to make the derived brightness value has the better display quality. FIG. 6A is a schematic illustration showing edge reference pixels that are used when the de-interlacer 140 performs the third step. The coordinates of the current pixel are (i,j), the pixels U1 to U5 and L1 to L5 on the (j−1)th and (j+1)th lines have the valid values, and are thus taken as the reference pixels represented by the circular symbols; and the pixels on the j-th line have no valid values and are represented by the triangular symbols. The quarter-pels between two adjacent pixels are represented by small circles, are derived by way of interpolation between the pixels, and are not the actually existing pixels.

(4c-1) Approximately Horizontal

Figure 6B:
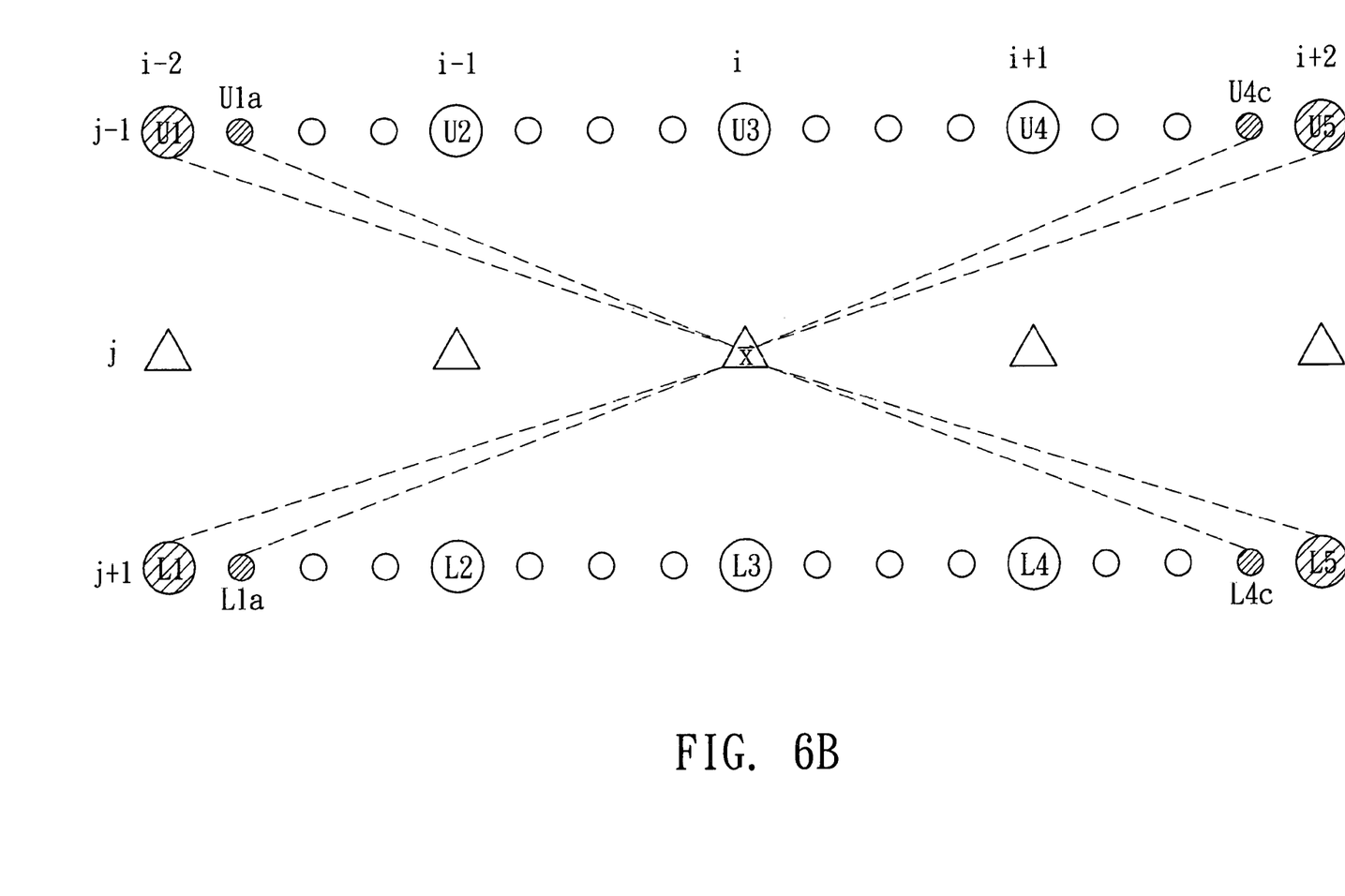
FIG. 6B shows the required reference pixels for calculating the brightness value of the current pixel when the current pixel is positioned on the approximately horizontal edge.
Figure 6C:
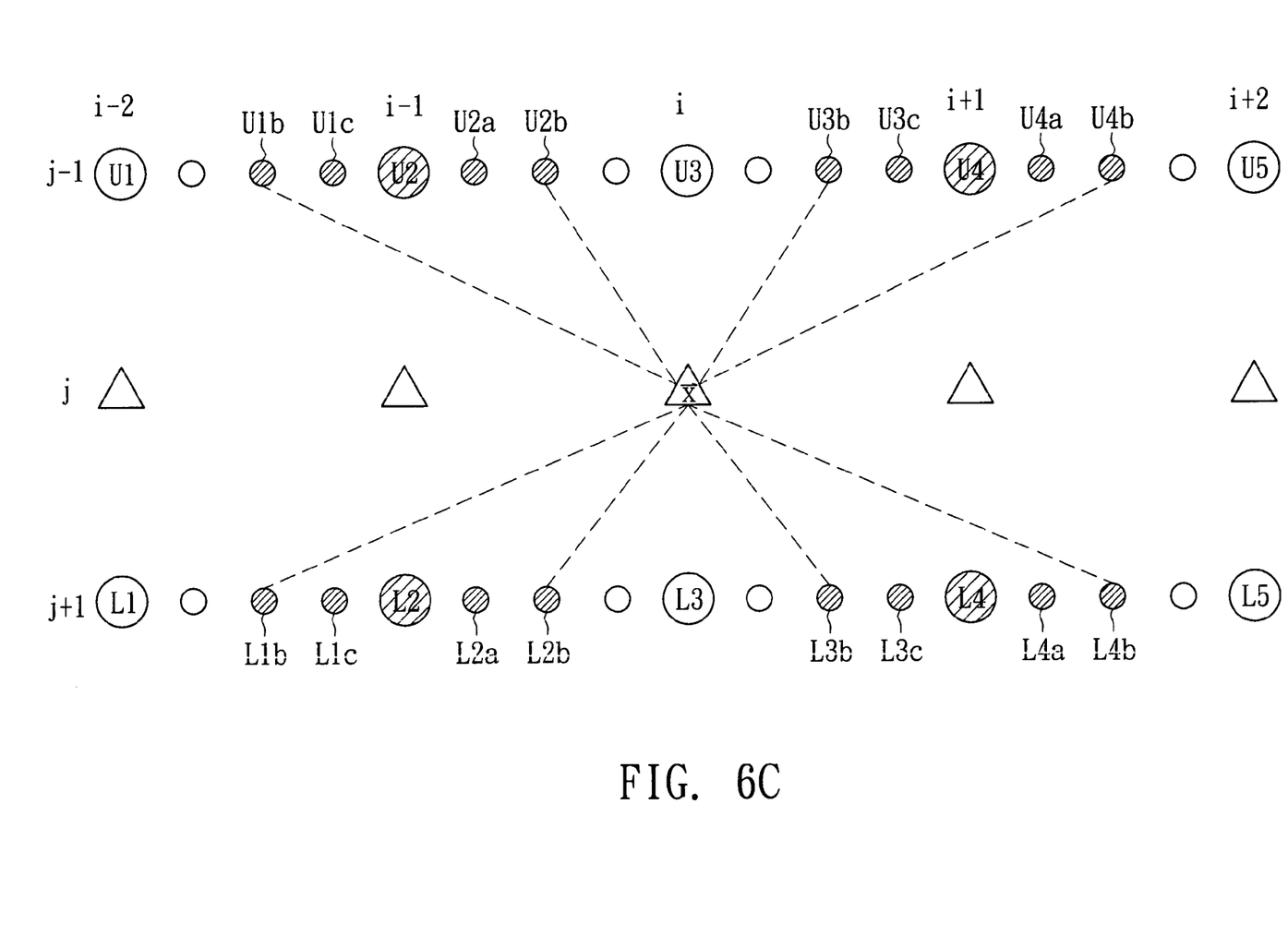
FIG. 6C shows the required reference pixels for calculating the brightness value of the current pixel when the current pixel is positioned on the approximate 45-degree edge.

FIG. 6B shows the required reference pixels for calculating the brightness value of the current pixel when the current pixel is positioned on the approximately horizontal edge. When the current pixel is positioned on the approximately horizontal edge, the used reference pixels are U1, U5, L1, L5 and its adjacent quarter-pels U1a, U4c, L1a and L4c. The de-interlacer 140 determines the reference pixels having the highest correlation with the inclined edge on which the current pixel is positioned, and the reference pixels are interpolated and the brightness value of the current pixel is outputted. When the current pixel is positioned on the approximately horizontal edge and the slope of the edge is negative, the reference pixels having the highest correlation with the inclined edge on which the current pixel is positioned are the pixels U1, L5, quarter-pel U1a and L4c, according to which the brightness value of the current pixel is derived by the following equations:

$D_1 = |B_{U1} - B_{L5}|$ $D_2 = |B_{U1a} - B_{L4c}|$ $F_o = \frac{1}{2} \times (B_{U1} + B_{L5})$ if $\min(D_1, D_2) = D_1$ $F_o = \frac{1}{2} \times (B_{U1a} + B_{L4c})$ if $\min(D_1, D_2) = D_2$ When the current pixel is positioned on the approximately horizontal edge and the slope of the edge is positive, the reference pixels having the highest correlation with the inclined edge on which the current pixel is positioned are pixels U5, L1, quarter-pels U4c and L1a, according to which the brightness value of the current pixel is derived by the following equations:

$D_3 = |B_{U5} - B_{L1}|$ $D_4 = |B_{U4c} - B_{L1a}|$ $F_o = \frac{1}{2} \times (B_{U5} + B_{L1})$ if $\min(D_3, D_4) = D_3$ $F_o = \frac{1}{2} \times (B_{U4c} + B_{L1a})$ if $\min(D_3, D_4) = D_4$ When the current pixel is positioned on the approximately horizontal edge and the slope is indefinite, the brightness value of the current pixel is derived according to the reference pixels U1, U5, L1, L5 and its adjacent quarter-pel U1a, U4c, L1a and L4c by the following equations:

$F_o = \frac{1}{2} \times (B_{U1} + B_{L5})$ if $\min(D_1, D_2, D_3, D_4) = D_1$ $F_o = \frac{1}{2} \times (B_{U1a} + B_{L4c})$ if $\min(D_1, D_2, D_3, D_4) = D_2$ $F_o = \frac{1}{2} \times (B_{U5} + B_{L1})$ if $\min(D_1, D_2, D_3, D_4) = D_3$ $F_o = \frac{1}{2} \times (B_{U4c} + B_{L1a})$ if $\min(D_1, D_2, D_3, D_4) = D_4$ (4c-2) Approximate 45 Degrees FIG. 6C shows the required reference pixels for calculating the brightness value of the current pixel when the current pixel is positioned on the approximate 45-degree edge. When the current pixel is positioned on the approximately horizontal edge, the used reference pixels are represented by the hatched lines, and are pixels U2, U4, L2, L4 and its adjacent quarter-pels U1b, U1c, U2a, U2b, U3b, U3c, U4a, U4b, L1b, L1c, L2a, L2b, L3b, L3c, L4a and L4b, respectively. The de-interlacer 140 determines the reference pixels having the highest correlation with the inclined edge on which the current pixel is positioned, the reference pixels are interpolated, and the brightness value of the current pixel is outputted. When the edge, on which the current pixel is positioned, has a negative slope, the reference pixels having the highest correlation with the inclined edge on which current pixel is positioned are the pixels U2, L4, and the quarter-pels U1b, U1c, U2a, U2b, L3b, L3c, L4a and L4b, according to which the brightness value of the current pixel is derived using the same equations as those in the method for the approximately horizontal edge, and detailed descriptions thereof will be omitted. When the edge, on which the current pixel is positioned, has a positive slope, the reference pixels having the highest correlation with the inclined edge on which the current pixel is positioned are the pixels U4, L2, and the quarter-pels U3b, U3c, U4a, U4b, L1b, L1c, L2a and L2b, according to which the brightness value of the current pixel is derived. When the edge, on which the current pixel is positioned, has a indefinite slope, the reference pixels having the highest correlation with the inclined edge on which the current pixel is positioned are the pixels U2, U4, L2, L4 and its adjacent quarter-pels U1b, U1c, U2a, U2b, U3b, U3c, U4a, U4b, L1b, L1c, L2a, L2b, L3b, L3c, L4a and L4b, according to which the brightness value of the current pixel is derived.

(4c-3) Approximately Vertical

Figure 6D:
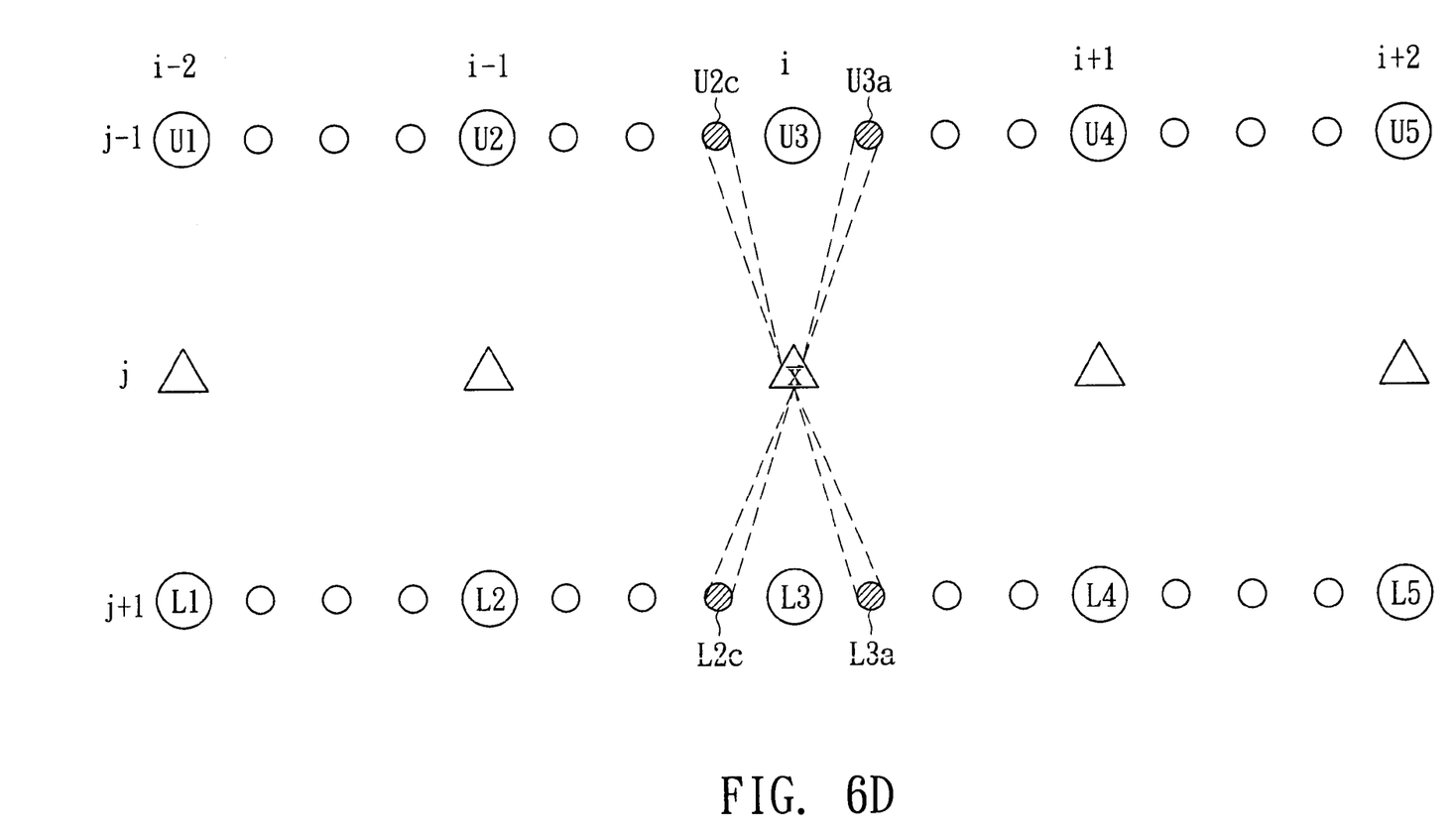
FIG. 6D shows the required reference pixels for calculating the brightness value of the current pixel when the current pixel is positioned on the approximately vertical edge.

FIG. 6D shows the required reference pixels for calculating the brightness value of the current pixel when the current pixel is positioned on the approximately vertical edge. When the current pixel is positioned on the approximately horizontal edge, the used reference pixels are the quarter-pels U2c, U3a, L2c and L3a respectively, as indicated in FIG. 6D by circles with hatched lines. The de-interlacer 140 determines the reference pixels having the highest correlation with the inclined edge on which the current pixel is positioned, the reference pixels are interpolated, and the brightness value of the current pixel is outputted. When the edge, on which the current pixel is positioned, has a negative slope, the reference pixels having the highest correlation with the inclined edge on which the current pixel is positioned are the quarter-pels U2c and L3a, according to which the brightness value of the current pixel is derived using the same equations as those in the method for the approximately horizontal edge, and detailed descriptions thereof will be omitted. When the edge, on which the current pixel is positioned, has a positive slope, the reference pixels having the highest correlation with the inclined edge on which the current pixel is positioned are the quarter-pels U3a and L2c, according to which the brightness value of the current pixel is derived. When the edge, on which the current pixel is positioned, has an indefinite slope, the reference pixels having the highest correlation with the inclined edge on which the current pixel is positioned are the quarter-pels U2c, U3a, L2c and L3a, according to which the brightness value of the current pixel is derived.

The above-mentioned methods for calculating the current pixel on the inclined edge obtain the brightness values of the current pixels by the pixel-based method. However, the implementation of these methods is not restricted to using only five pixels above, U1 to U5, and below, L1 to L5 as reference pixels. In addition to the above-described interpolation with a ratio of a quarter of the distance between pixels and equal scaling, the interpolation can be performed by giving a higher weighting coefficient to the pixel closer to the valid pixel. Further, a block-based approach to obtaining the brightness value of the current pixel can be adopted. For example, the brightness value of the pixel U2 used in the above methods can be replaced by the average of the pixel U2 and its left and right quarter-pels U1b, U1c, U2a, and U2c, or the average of U1c and U2a.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An edge-based method for de-interlacing an image, which comprises a target pixel, a first pixel positioned at an upper-left side of the target pixel, a second pixel positioned above the target pixel, a third pixel positioned at an upper-right side of the target pixel, a fourth pixel positioned at a lower-left side of the target pixel, a fifth pixel positioned below the target pixel, and a sixth pixel positioned at a lower-right side of the target pixel, the method being for calculating a brightness value of the target pixel, the method comprising the steps of:

calculating a horizontal coefficient and a vertical coefficient according to brightness values of the first to sixth pixels;

determining an edge type of the target pixel, wherein
the edge type of the target pixel is a smooth region if the horizontal and vertical coefficients are smaller than a horizontal threshold value and a vertical threshold value respectively,
the edge type of the target pixel is a vertical edge if the horizontal coefficient is smaller than the horizontal threshold value and the vertical coefficient is greater than the vertical threshold value,
the edge type of the target pixel is a horizontal edge if the horizontal coefficient is greater than the horizontal threshold value and the vertical coefficient is smaller than the vertical threshold value, and
the edge type of the target pixel is an inclined edge if the horizontal and vertical coefficients are greater than the horizontal and vertical threshold values respectively;

determining a plurality of reference pixels according to the edge type of the target pixel; and
calculating the brightness value of the target pixel according to the reference pixels.

2. The method according to claim 1, wherein the reference pixels are the second pixel and the fifth pixel if the edge type of the target pixel is one of the smooth region and the vertical edge.

3. The method according to claim 1, wherein if the edge type of the target pixel is the horizontal edge, the step of determining the reference pixels comprises the steps of:

respectively selecting a seventh pixel at the upper-left side of the target pixel, an eighth pixel at the upper-right side of the target pixel, a ninth pixel at the lower-left side of the target pixel, and a tenth pixel at the lower-right side of the target pixel from a set of predetermined displacement vectors, wherein the seventh to tenth pixels are not actually existing pixels, and brightness values of the seventh to tenth pixels are calculated according to brightness values of a plurality of nearest pixels by way of a half-pel method;

calculating a first brightness profile value, which is a difference between the brightness values of the seventh and tenth pixels;

calculating a second brightness profile value, which is a difference between the brightness values of the eighth pixel and the ninth pixel; and comparing the first brightness profile value to the second brightness profile value, wherein the reference pixels are the seventh and tenth pixels if the first brightness profile value is smaller than the second brightness profile value; or otherwise the reference pixels are the eighth and ninth pixels.

4. The method according to claim 1, wherein if the edge type of the target pixel is the inclined edge, the step of determining the reference pixels comprises the steps of:

determining angle information of the inclined edge according to the horizontal and vertical coefficients, wherein
the angle information is approximately horizontal if the horizontal coefficient is greater than $\Omega$ times of the vertical coefficient,
the angle information is approximately vertical if the vertical coefficient is greater than $\Omega$ times of the horizontal coefficient, and
otherwise the angle information is approximate 45 degrees,
wherein $\Omega$ is a predetermined positive number;

selecting an eleventh pixel at the upper-left side of the target pixel, wherein the eleventh pixel is more away from the target pixel than the first pixel;

selecting a twelfth pixel at the upper-right side of the target pixel, wherein the twelfth pixel is more away from the target pixel than the third pixel;

selecting a thirteenth pixel at the lower-left side of the target pixel, wherein the thirteenth pixel is more away from the target pixel than the fourth pixel;

selecting a fourteenth pixel at the lower-right side of the target pixel, wherein the fourteenth pixel is more away from the target pixel of the sixth pixel;

determining a tilt direction of the target pixel according to tilt directions of the eleventh to fourteenth pixels, wherein
the tilt directions of the target and eleventh pixels are the same if the tilt directions of the eleventh and fourteenth pixels are the same; and the tilt directions of the target pixel and the twelfth pixel are the
same if the tilt directions of the twelfth and thirteenth pixels are the same; and
selecting the reference pixels according to the angle information and the tilt direction of the target pixel.

5. The method according to claim 4, wherein the tilt direction of the thirteenth pixel is obtained by way of estimation, which comprises the steps of:
selecting a fifteenth pixel, a sixteenth pixel, a seventeenth pixel, and an eighteenth pixel, wherein the fifteenth to eighteenth pixels are nearest to the thirteenth pixel while the fifteenth pixel is at the upper-left side of the thirteenth pixel, the sixteenth pixel is at the upper-right side of the thirteenth pixel, the seventeenth pixel is at the lower-left side of the thirteenth pixel, and the eighteenth pixel is at the lower-right side of the thirteenth pixel; and
determining whether the tilt direction of the thirteenth pixel has a positive slope, wherein if the correlation between the sixteenth pixel and the seventeenth pixel is higher than that between the fifteenth pixel and the eighteenth pixel, the tilt direction of the thirteenth pixel has a positive slope; or otherwise a negative slope.

6. The method according to claim 4, wherein the step of selecting the reference pixels comprises the steps of:
selecting a nineteenth pixel at a left side of the first pixel, a twentieth pixel at a right side of the third pixel, a 21st pixel at the left side of the fourth pixel, and a 22nd pixel at the right side of the sixth pixel;
selecting a 23rd pixel between the first and second pixels, a 24th pixel between the second and third pixels, a 25th pixel between the fourth and fifth pixels, and a 26th pixel between the fifth and sixth pixels, wherein the 23rd to 26th pixels are not actually existing pixels;
defining the reference pixels according to the angle information, wherein
if the angle information is approximately vertical, the reference pixels are either the 23rd and 26th pixels, or the 24th and 25th pixels;
if the angle information is approximate 45 degrees, the reference pixels comprise either the first and sixth pixels, or the third and fourth pixels; and
if the angle information is approximately horizontal, the reference pixels comprise either the nineteenth and 22nd pixels, or the twentieth and 21st pixels.

7. The method according to claim 6, wherein the brightness value of the 23rd pixel is calculated according to the brightness values of the first and second pixels by way of interpolation.

8. The method according to claim 6, further comprising the steps of:
selecting a 27th pixel between the first and nineteenth pixels, a 28th pixel between the third and twentieth pixels, a 29th pixel between the fourth and 21st pixels, and a 30th pixel between the sixth and 22nd pixels, wherein the 27th to 30th pixels are not actually existing pixels; and
if the angle information is approximately horizontal, defining the reference pixels as either the 27th and 30th pixels, or the 28th and 29th pixels.

9. The method according to claim 1, wherein the step of determining the reference pixels comprises the steps of:
selecting a plurality of pixel sets according to the edge type of the target pixel, wherein each of the pixel sets comprises two pixels with the target pixel as a symmetrical center; and
selecting one of the pixel sets which has a minimum difference in brightness between the pixels of the pixel set as the reference pixels.

10. The method according to claim 1, wherein the brightness value of the target pixel is an average of the brightness values of the reference pixels.

11. A method for de-interlacing an image, which comprises a target pixel, a first pixel positioned at an upper-left side of the target pixel, a second pixel positioned above the target pixel, a third pixel positioned at an upper-right side of the target pixel, a fourth pixel positioned at a lower-left side of the target pixel, a fifth pixel positioned below the target pixel, a sixth pixel positioned at a lower-right side of the target pixel, a 31st pixel at a left side of the target pixel, and a 32nd pixel at a right side of the target pixel, the method being for calculating a brightness value of the target pixel and comprising the steps of:
determining whether the target pixel is motional according to at least one parameter;
calculating a horizontal coefficient and a vertical coefficient according to brightness values of the first to sixth pixels;
determining an edge type of the target pixel, wherein
the edge type of the target pixel is a smooth region if the horizontal and vertical coefficients are smaller than a horizontal threshold value and a vertical threshold value respectively,
the edge type of the target pixel is a vertical edge if the horizontal coefficient is smaller than the horizontal threshold value and the vertical coefficient is greater than the vertical threshold value,
the edge type of the target pixel is a horizontal edge if the horizontal coefficient is greater than the horizontal threshold value and the vertical coefficient is smaller than the vertical threshold value, and
the edge type of the target pixel is an inclined edge if the horizontal and vertical coefficients are greater than the horizontal and vertical threshold values respectively; and
calculating the brightness value of the target pixel by selecting a plurality of reference pixels having the strongest correlation with the target pixel according to the edge type of the target pixel.

12. The method according to claim 11, wherein the step of determining whether the target pixel is motional comprises the steps of:
selecting a plurality of motion reference pixels of the target pixel;
calculating at least one brightness difference, at least one horizontal brightness profile value and at least one vertical brightness profile value according to the motion reference pixels and the target pixel, wherein the at least one brightness difference is a difference between the brightness values of the motion reference pixels at two different time instants; the at least one horizontal brightness profile value comprises a difference between the brightness values of two of the motion reference pixels in the same horizontal direction; the at least one vertical brightness profile value comprises a difference between the brightness values of two of the motion reference pixels in the same vertical direction;
comparing the at least one brightness difference to a first threshold value, wherein if the at least one brightness difference is greater than the first threshold value, the target pixel is motional;

comparing the at least one horizontal brightness profile value to a second threshold value, wherein if the at least one horizontal brightness profile value is greater than the second threshold value, the target pixel is motional; and comparing the at least one vertical brightness profile value to a third threshold value, wherein if the at least one vertical brightness profile value is greater than the third threshold value, the target pixel is motional.

13. The method according to claim 12, wherein the motion reference pixels are selected from the first to sixth pixels, and the 31st to 32nd pixels.

14. The method according to claim 12, wherein the image comprises a (n−2)th field, a (n−1)th field, an n-th field, and a (n+1)th field, and the method is for calculating the brightness value of the target pixel in the n-th field, wherein n is a positive integer.

15. The method according to claim 14, wherein the at least one brightness difference of the motion reference pixels is the difference between the brightness value of the motion reference pixel in the n-th field and the brightness value of the motion reference pixel in the (n−2)th field.

16. The method according to claim 15, wherein the motion reference pixels are the second and fifth pixels.

17. The method according to claim 14, wherein the at least one brightness difference of the motion reference pixels is a difference between the brightness value of the motion reference pixel in the (n+1)th field and the brightness value of the motion reference pixel in the (n−1)th field.

18. The method according to claim 17, wherein the motion reference pixel is the target pixel.

19. The method according to claim 14, wherein the step of calculating the at least one horizontal brightness profile value of the motion reference pixel comprises the steps of:

calculating a left brightness profile value (n), which is a brightness difference between the motion reference pixel in the n-th field and a corresponding left-side pixel of the motion reference pixel in the n-th field;

calculating a left brightness profile value (n−2), which is a brightness difference between the motion reference pixel in the (n−2)th field and a corresponding left-side pixel of the motion reference pixel in the (n−2)th field;

calculating a right brightness profile value (n), which is a brightness difference between the motion reference pixel in the n-th field and a corresponding right-side pixel of the motion reference pixel in the n-th field;

calculating a right brightness profile value (n−2), which is a brightness difference between the motion reference pixel in the (n−2)th field and a corresponding right-side pixel of the motion reference pixel in the (n−2)th field; and calculating the at least one horizontal brightness profile value of the motion reference pixel by summing an absolute difference between the left brightness profile value (n) and the left brightness profile value (n−2), and an absolute difference between the right brightness profile value (n) and the right brightness profile value (n−2).

20. The method according to claim 14, wherein in the step of determining whether the target pixel is motional, the step of calculating the at least one vertical brightness profile value comprises the steps of:

calculating a first brightness profile value (n), which is a brightness difference between the first and fourth pixels in the n-th field;

calculating a second brightness profile value (n), which is a brightness difference between the third and sixth pixels in the n-th field;

calculating a third brightness profile value (n), which is a brightness difference between the second and fifth pixels in the n-th field;

calculating a first brightness profile value (n−2), which is a brightness difference between the first and fourth pixels in the (n−2)th field;

calculating a second brightness profile value (n−2), which is a brightness difference between the third and sixth pixels in the (n−2)th field;

calculating a third brightness profile value (n−2), which is a brightness difference between the second and fifth pixels in the (n−2)th field; and calculating the at least one vertical brightness profile value, which is a sum of an absolute difference between the first brightness profile value (n) and the first brightness profile value (n−2), an absolute difference between the second brightness profile value (n) and the second brightness profile value (n−2), and an absolute difference between the third brightness profile value (n) and the third brightness profile value (n−2).

21. A de-interlacing apparatus for de-interlacing an image, the apparatus comprising:

a motion detector determining whether or not a target pixel is motional;

an edge detector coupled to the motion detector for detecting an edge type of the target pixel if the target pixel is motional; and an edge-based de-interlacer coupled to the edge detector for determining a plurality of reference pixels according to the edge type and calculating the brightness value of the target pixel according to the reference pixels.

* * * * *